United States Patent [19]

Wludyka

[11] 4,239,413
[45] Dec. 16, 1980

[54] HANDLE BRACE

[76] Inventor: Joseph Wludyka, 7521 Branch St., Hollywood, Fla. 33024

[21] Appl. No.: 917,641

[22] Filed: Jun. 21, 1978

[51] Int. Cl.³ .......................... B25G 3/00; F16B 9/02
[52] U.S. Cl. .................................. 403/263; 403/286; 403/237; 15/235.4; 15/144 R
[58] Field of Search ............... 403/187, 189, 234, 237, 403/263, 233, 261, 386, 208; 15/235.8, 229.2, 229 R, 144 R, 145; 172/327; 56/342, 400.19; 401/136, 137, 138, 140

[56] References Cited

U.S. PATENT DOCUMENTS 2,922,179 1/1960 Lundgren ........................ 403/189 X
3,188,671 6/1965 Kane .............................. 403/187 X

*Primary Examiner*—Wayne L. Shedd
*Attorney, Agent, or Firm*—Gustave Miller

[57] ABSTRACT

A handle brace for use with a push broom having a broom handle and a broom block with a bore portion to receive the broom handle which comprises an adjustable clamping portion surrounding the handle. The handle brace further includes a pair of brace rods connected to the clamping portion and the broom block for supporting the broom handle.

1 Claim, 4 Drawing Figures

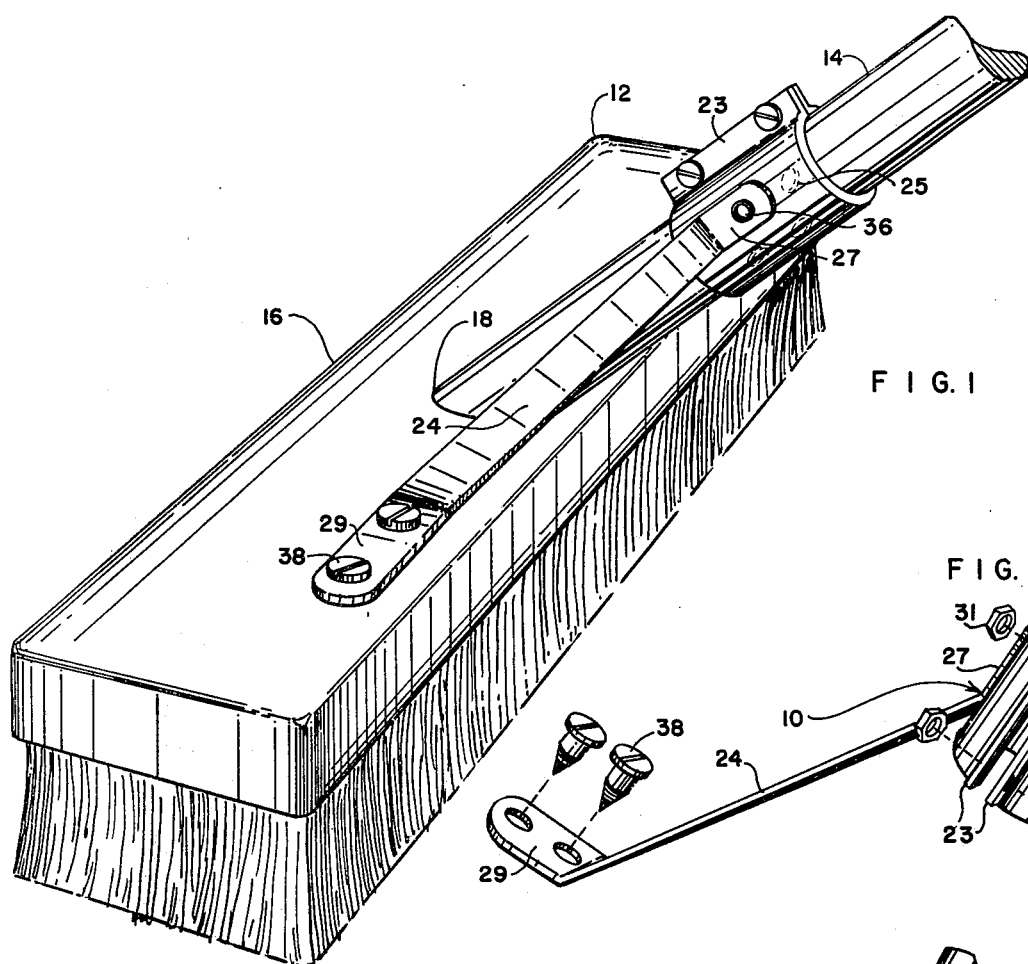
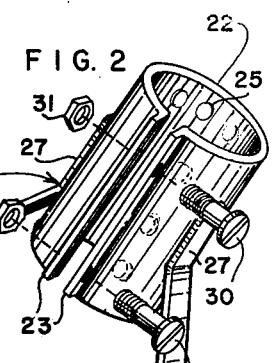
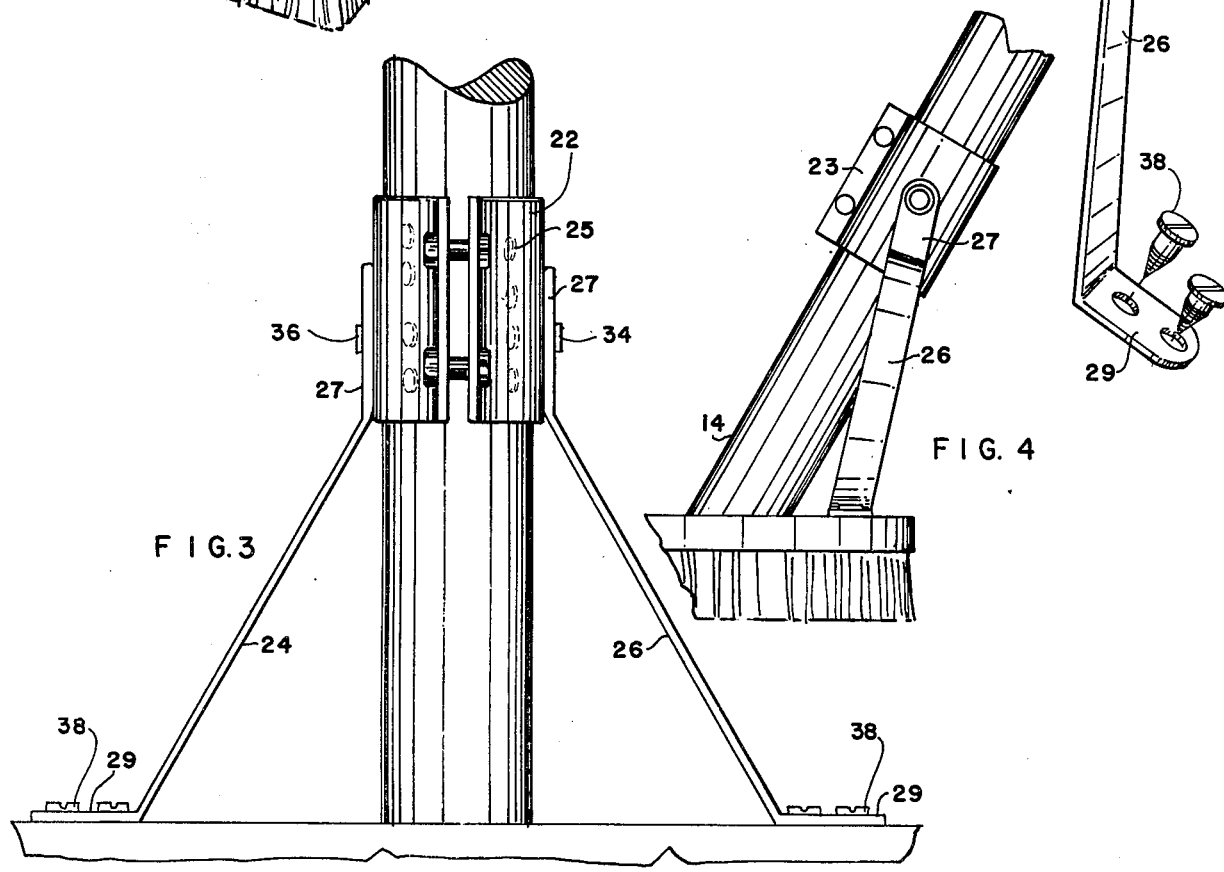

HANDLE BRACE

BACKGROUND OF THE INVENTION

While the invention is subject to a wide range of applications, it is especially suited for use with a push broom and will be particularly described in that connection.

Among the problems involved in push brooms is that the handle frequently becomes loose. Further the threaded portion of the handle often cracks or breaks from bumping the broom block into some object.

U.S. Pat. No. 3,827,100 to Griffin and Wilson discloses, for example, "The wax applicator includes an elongated carrier member to which is rigidly secured an elongated pulling handle."

U.S. Pat. No. 2,163,979 to Judson discloses, for example, "this invention relates to attachments for brooms of the type employed for cleaning floors of buildings."

It is an object of the present invention to provide a handle brace for use with a push broom which prevents the loosening of the handle.

It is further object of the present invention to provide a handle brace which prevents breaking of the threaded portion of a broom handle.

It is a further object of the present invention to provide an handle brace which is relatively inexpensive to manufacture.

SUMMARY OF THE INVENTION

In accordance with the present invention, there is disclosed a handle brace for use with a push broom having a broom handle and broom block with a bore portion to receive the broom handle which comprises an adjustable clamping portion surrounding the handle. The handle brace further includes a pair of brace rods connected to the clamping portion and the broom block for supporting the handle.

For a better understanding of the present invention, together with other and further objects thereof, reference is made to the following description, taken in connection with the accompanying drawings, while its scope will be pointed out in the appended claims.

BRIEF DESCRIPTION OF THE DRAWINGS

FIG. 1 is an illustrated view of a handle brace in accordance with the present invention.

FIG. 2 is a perspective view of the brace member in accordance with the present invention;

FIG. 3 is a front perspective view of the handle brace;

FIG. 4 is a side perspective view of the handle brace.

DESCRIPTION OF THE PREFERRED EMBODIMENT

In accordance with the present invention, a handle brace 10 for use with a push broom 12 having a broom handle 14, and a broom block 16 with a threaded bore portion 18, not shown, to receive the threaded end of the broom handle 14, comprises an adjustable clamping portion 22 surrounding the handle 14. The flat brace member further includes a pair of brace struts 24 and 26 connected to the clamping portion 22 and the broom block 16 for supporting the handle 14.

Referring to FIG. 2, there is shown a perspective view of a handle brace 10 having an adjustable clamping portion 22 which has a diameter which may be, for example, that of standard broom handles. An adjustment is provided by means, such as for example, bolts 30 and nuts 31 which can be tightened and loosened according to the requirements of the handle inserted therein, the bolts 30 extending through parallel outwardly axially extending lips 23 from a slit in clamp 22. In addition protuberances 25, are provided in clamping portion 22 and consist of indentations within the clamping portion 22 to grip the handle and prevent any rotation thereof.

A pair of flat brace struts 24 and 26 are pivotally connected at one of their angled ends 27 to the clamping portion 22 by any such means, such as, for example, pivot rivets 34 and 36 as best seen in FIG. 3. Clamping portion 22 is able to pivot about the rivets 34 and 36 so that the bolts and nuts 30 and 32 may be on either side of broom handle 14, as best seen in FIG. 1. In addition, the other angled ends 29 of the brace struts extend at right angles to angled ends 27 and are attached to broom block 16 by any such means such as for example screws 38.

The present invention can easily be installed on a push broom by simply adjusting clamping portion 22 to the proper height so that the ends 29 of brace struts 24 and 26 can be attached to broom block 16. The brace prevents broom handle 14 from rotating within broom block 16 and further supports the handle to prevent breaking or cracking of its threaded portion within the bore 18 from bumping broom block 16 into some object.

One skilled in the art will realize that there has been disclosed a handle brace which prevents the loosening of a handle, prevents breaking of the threaded portion of a handle, and is relatively inexpensive to manufacture.

While there has been described what is at present considered a preferred embodiment of the invention, it will be obvious to those skilled in the art that various changes and modifications may be made therein without departing from the invention, and it is, therefore aimed in the appended claim to cover all such changes and modifications as followed in the true spirit and scope of the invention.

What is claimed is:

1. A handle brace for use with a push broom having a handle rod (14) and a broom block (16), the block having a bore (18) to receive a threaded end of the broom handle rod, said handle brace comprising a cylindrically shaped adjustable clamping member (22) through which said handle rod is inserted, said cylindrically shaped clamping member having an axially extending slit therein, normally spaced apart lips (23) extending outwardly from said clamping member at said slit, each lip having complementary bolt receiving apertures therein, said clamping member having internally extending protuberances (25) therein to press into said handle rod when the clamping member is tightened, bolts (30) extending through said bolt apertures in said lips, and nuts 31 for tightening said bolts to clamp said clamping member about a handle rod (14) extending therethrough, two pivot rivets (34 and 36) extending from opposite sides of said clamping member, a pair of flat brace struts (24 and 26) each having an angular extension (27 and 29) at each end, the angular extension at one end of each strut extending at right angles to the other angular extension of said same strut, one angular end of each strut being pivoted on one of said pivot rivets, the second angular end of each strut having screw receiving apertures, and screws (36 and 38) extending through said screw receiving apertures for securing said struts to the broom block to thus firmly secure the broom block to the broom handle rod.

* * * * *